US012759271B2

(12) United States Patent
Roach et al.

(10) Patent No.: US 12,759,271 B2
(45) Date of Patent: Oct. 13, 2026

(54) CERAMIC MATRIX COMPOSITES AND METHOD OF MAKING

(71) Applicant: RAYTHEON TECHNOLOGIES CORPORATION, Farmington, CT (US)

(72) Inventors: James T. Roach, Vernon, CT (US); Brendan Michael Lenz, North Branford, CT (US); Kathryn Sarah Read, Marlborough, CT (US)

(73) Assignee: RTX CORPORATION, Farmington, CT (US)

( * ) Notice: Subject to any disclaimer, the term of this patent is extended or adjusted under 35 U.S.C. 154(b) by 162 days.

(21) Appl. No.: 18/571,459

(22) PCT Filed: Jun. 17, 2022

(86) PCT No.: PCT/US2022/034000

§ 371 (c)(1),
(2) Date: Dec. 18, 2023

(87) PCT Pub. No.: WO2022/266446

PCT Pub. Date: Dec. 22, 2022

(65) Prior Publication Data

US 2024/0278543 A1 Aug. 22, 2024

Related U.S. Application Data

(60) Provisional application No. 63/212,447, filed on Jun. 18, 2021.

(51) Int. Cl.

*B32B 18/00* (2006.01)
*B32B 3/26* (2006.01)

(Continued)

(52) U.S. Cl.

CPC ................ *B32B 18/00* (2013.01); *B32B 3/26* (2013.01); *B32B 5/12* (2013.01); *B32B 5/26* (2013.01);

(Continued)

(58) Field of Classification Search

CPC .. B32B 18/00; B32B 3/26; B32B 5/12; B32B 5/26; B32B 2250/20; B32B 2260/023; B32B 2262/105; B32B 2262/106

See application file for complete search history.

(56) References Cited

U.S. PATENT DOCUMENTS 5,354,398 A 10/1994 Kawai
5,487,941 A 1/1996 Pepin (Continued)

FOREIGN PATENT DOCUMENTS

CA 1175332 A 10/1984
WO 2018139028 A1 8/2018

(Continued)

OTHER PUBLICATIONS

Search Report issued in European Patent Application No. 22912342.7; Date of Mailing Nov. 14, 2025 (9 pages).

(Continued)

*Primary Examiner* — Joanna Pleszczynska

(74) *Attorney, Agent, or Firm* — CANTOR COLBURN LLP

(57) ABSTRACT

A ceramic matrix composite laminate comprises a ceramic matrix that encapsulates a plurality of layers. Each layer comprises fibers. Each layer comprises a plurality of fill fibers and a plurality of warp fibers or a plurality of bias fibers. The outermost layer contains a different concentration of fibers per unit volume than a layer located near an interior of the ceramic matrix composite laminate. A gradient in the number of fibers exists between the outermost layer and the (Continued)

layer located at the interior of the ceramic matrix composite laminate, or a combination thereof. A combined ceramic matrix composite comprises a plurality of composite laminates; wherein each laminate has a different fiber concentration gradient from another laminate that it is in contact with.

20 Claims, 9 Drawing Sheets

(51) Int. Cl.
*B32B 5/12* (2006.01)
*B32B 5/26* (2006.01)
*B32B 38/08* (2006.01)

(52) U.S. Cl.
CPC .......... *B32B 38/08* (2013.01); *B32B 2250/20* (2013.01); *B32B 2260/023* (2013.01); *B32B 2262/105* (2013.01); *B32B 2262/106* (2013.01)

(56) References Cited

U.S. PATENT DOCUMENTS

| | | | |
|---|---|---|---|
| 5,916,510 | A | 6/1999 | Jessen |
| 5,939,216 | A | 8/1999 | Kameda et al. |
| 5,961,661 | A | 10/1999 | Jessen |
| 6,418,973 | B1 | 7/2002 | Cox et al. |
| 6,641,893 | B1 | 11/2003 | Suresh et al. |
| 7,073,538 | B2 | 7/2006 | Bhatnagar et al. |
| 7,223,465 | B2 | 5/2007 | Subramanian et al. |
| 7,754,126 | B2 | 7/2010 | Subramanian et al. |
| 8,545,938 | B2 | 10/2013 | Schmidt et al. |
| 9,550,340 | B2 | 1/2017 | Olivier |
| 10,011,535 | B2 | 7/2018 | La Forest et al. |
| 10,279,553 | B2 | 5/2019 | Hyson |
| 10,384,981 | B2 | 8/2019 | Hall et al. |
| 10,480,108 | B2 | 11/2019 | Shi |
| 10,604,872 | B1 | 3/2020 | Stackpoole et al. |
| 10,618,848 | B2 | 4/2020 | Luthra et al. |
| 10,822,280 | B2 | 11/2020 | Harris et al. |
| 10,913,687 | B2 | 2/2021 | Dambrine |
| 10,995,039 | B1 | 5/2021 | Dunn et al. |
| 10,995,040 | B2 | 5/2021 | Lamusga et al. |
| 11,021,779 | B2 | 6/2021 | Barrett et al. |
| 11,097,983 | B2 | 8/2021 | Hall et al. |
| 2003/0232946 | A1 | 12/2003 | Pope et al. |
| 2007/0007678 | A1 | 1/2007 | Benitsch |
| 2010/0119777 | A1 | 5/2010 | Merrill et al. |
| 2015/0240072 | A1 | 8/2015 | Esser-Kahn et al. |
| 2016/0136925 | A1 | 5/2016 | Chamberlain et al. |
| 2016/0348511 | A1 | 12/2016 | Varney |
| 2017/0015595 | A1 | 1/2017 | Weaver et al. |
| 2017/0306769 | A1 | 10/2017 | Lazur |
| 2018/0002238 | A1 | 1/2018 | Hockemeyer et al. |
| 2018/0044249 | A1 | 2/2018 | Taillet et al. |
| 2018/0179906 | A1 | 6/2018 | Schetzel et al. |
| 2018/0312950 | A1 | 11/2018 | Barrett et al. |
| 2019/0048730 | A1 | 2/2019 | Subramanian et al. |
| 2019/0100845 | A1 | 4/2019 | Ohashi et al. |
| 2019/0177240 | A1 | 6/2019 | Harris |
| 2019/0345073 | A1 | 11/2019 | Hall et al. |
| 2019/0359531 | A1 | 11/2019 | Steffier et al. |
| 2020/0011190 | A1 | 1/2020 | Read |
| 2020/0181029 | A1 | 6/2020 | Clerambourg et al. |
| 2020/0308066 | A1 | 10/2020 | Shiang et al. |
| 2020/0346983 | A1 | 11/2020 | Read et al. |
| 2021/0024427 | A1 | 1/2021 | Liliedahl et al. |
| 2021/0262353 | A1 | 8/2021 | Mccaffrey et al. |
| 2023/0019485 | A1 | 1/2023 | Sudre et al. |
| 2023/0191656 | A1 | 6/2023 | Read et al. |
| 2023/0192562 | A1 | 6/2023 | Read et al. |
| 2024/0067578 | A1 | 2/2024 | Konopaske et al. |
| 2024/0199499 | A1 | 6/2024 | Read et al. |
| 2024/0278529 | A1 | 8/2024 | Read et al. |

FOREIGN PATENT DOCUMENTS

| | | | |
|---|---|---|---|
| WO | 2020209848 | A1 | 10/2020 |
| WO | 2022266446 | A1 | 12/2022 |

OTHER PUBLICATIONS

Search Report issued in European Patent Application No. 22912343.5; Date of Mailing Nov. 24, 2025 (8 pages).
Search Report issued in European Patent Application No. 22912344.3; Date of Mailing Dec. 1, 2025 (8 pages).
International Search Report and Written Opinion issued in International Application No. PCT/US2022/053351; International Filing Date Dec. 19, 2022; Date of Mailing Mar. 17, 2023 (9 pages).
International Search Report and Written Opinion issued in International Application No. PCT/US2022/053354; International Filing Date Dec. 19, 2022; Date of Mailing Mar. 29, 2023 (12 pages).
International Search Report and Written Opinion issued in International Application No. PCT/US2022/053356; International Filing Date Dec. 19, 2022; Date of Mailing Mar. 22, 2023 (10 pages).
International Search Report for International Application Serial No. PCT/US2022/033998; International Filing Date Jun. 17, 2022; Report Mail Date Dec. 5, 2022 (7 pages).
International Search Report for International Application Serial No. PCT/US2022/034000; International Filing Date Jun. 17, 2022; Report Mail Date Oct. 11, 2022 (5 pages).
Written Opinion for International Application Serial No. PCT/US2022/033998; International Filing Date Jun. 17, 2022; Report Mail Date Dec. 5, 2022 (12 pages).
Written Opinion for International Application Serial No. PCT/US2022/034000; International Filing Date Jun. 17, 2022; Report Mail Date Oct. 11, 2022 (10 pages).

$$\delta_{11} \cong \delta_{12} \cong \delta_{13} \cong \delta_{14}$$

CERAMIC MATRIX COMPOSITES AND METHOD OF MAKING

CROSS REFERENCE TO RELATED APPLICATIONS

This application is a National Stage Application of PCT/US2022/034000 filed Jun. 17, 2022, which claims the benefit of U.S. Provisional Application No. 63/212,447 filed Jun. 18, 2021, both of which are incorporated by reference in their entirety herein.

BACKGROUND

This disclosure relates to a composite architecture, methods of manufacture thereof and articles comprising the same. In particular, this disclosure relates to composite architecture for ceramic matrix composites, methods of manufacture thereof and articles comprising the same.

Preforms are used for the fabrication of ceramic matrix composite (CMC) structures. A preform can include fibers, which can be unidirectional or woven (e.g., plain weave, 5 Harness Satin Weave, 8 Harness Satin Weave, twill, biaxial and triaxial braided structures, 3 dimensional weaving, or the like). In one form the fibers can be ceramic based and can comprise silicon carbide (SiC). Within the reaction chamber at an elevated temperature, the preform can be exposed to certain precursors. On being exposed to these precursors at an elevated temperature, a reaction can occur resulting in the deposition of a ceramic on the fibers of the preform to form a ceramic matrix composite.

Ceramic matrix composites (CMCs) made using chemical vapor infiltration (CVI), polymer infiltration pyrolysis (PIP), melt infiltration (MI), and the like, can potentially be used at temperatures of up to and greater than 2700° F. One of the key limitations of a CMC structure is that the structure can contain significant porosity (e.g., up to 15% and more) which is typically greatest in the center of the CMC structure and which can increase with an increasing thickness of the preform. The porosity can increase with thickness and can significantly impact both the in-plane and inter-laminar properties and overall oxidation resistance of the composite.

FIG. 1 depicts a conventional ceramic matrix composite 100 that contains a plurality of woven layers (first woven layer 102/103; second woven layer 202/203; third woven layer 104/105; fourth woven layer 204/205; and so on). The weaves shown in the FIG. 1 are created using groups of filaments called tows or fibers. In this disclosure the term “fiber” is used interchangeably with the term “tow”. Each woven layer comprises a weaving pattern in which the warp and fill fibers alternate. FIG. 2 depicts an upper surface of the woven layer 102/103. The warp fiber is the set of elements arranged in place on a loom before the fill is introduced during the weaving process. For example, in the first woven layer 102/103 the fiber 102 is the warp fiber and extends in length along the longitudinal direction (shown by the arrow) alternating above and below successive fill fibers 103 that extend in the lateral direction. The weaves shown in the FIGS. 1 and 2 are created using groups of fibers called tows. Each bundle of warp fibers and fill fibers is a tow. In this disclosure the term “fiber” is used interchangeably for the bundled fibers (i.e., a tow). The lateral direction is into the plane of the paper and is perpendicular to the longitudinal direction (which is in the plane of the paper).

In the first woven layer 102/103, it may be seen that the successive fill fibers 103 are periodically spaced and are equidistant from one another. The warp fiber 102 therefore has the profile of a sine wave. While the FIG. 1 depicts the warp fibers as being sinusoidal, this is for purposes of demonstration only. Other forms of periodicity (that are not necessarily sinusoidal) may be used in the weave. Alternatively, instead of a woven architecture a braided architecture, such as biaxial or triaxial could be used.

The second woven layer 202/203 contains a warp fiber 202 that extends in the longitudinal direction and alternates above and below successive fill fibers 203 that extend in the lateral direction. The fill fibers 203 in the second woven layer 202/203 are displaced by half a wavelength from the fill fibers 103 in the first layer 102/103. The successive fill fibers 203 in the second layer are also periodically spaced and are equidistant from one another. The periodicity (81) of the fill fibers 103 in the first woven layer 102/103 is equal to the periodicity (82) of the fill fibers 203 in the second woven layer 202/203.

It may be seen that the fibers in each alternating layer from the top of the composite is in phase with each other (i.e., the fill fiber lie directly atop one another). For example, in the uncompressed state, the fill fiber 103 of the first woven layer 102/103 lies directly above the fill fiber 105 of the third woven layer 104/105. Similarly, the fill fiber 203 of the second woven layer 202/203 lies directly above the fill fiber 205 of the fourth woven fly 204/205.

This pattern continues from the outer surface 292 to the center of the ceramic matrix composite 100. The center is identified by the line AA'. The same pattern is established from the inner surface 294 to the center AA' of the ceramic matrix composite 100.

From the FIG. 1, it may be seen that the periodicity (82) of the fill fibers 203 in the second woven layer 102/103 is equal to the periodicity (83) of the fill fibers 105 in the third woven layer 104/105, which is turn equal to the periodicity (84) of the fill fibers 205 in the fourth woven layer 204/205. It may be observed that the periodicity of the fill fibers in the first, second, third and fourth woven layers are equal to one another. In other words, $\delta_1=\delta_2=\delta_3=\delta_4$. This uniform periodicity between the fill fibers in the various layers is also established in the lower section of the ceramic matrix composite that extends from the inner surface to the center line AA'.

The arrangement shown in the FIG. 1 is disadvantageous in that the constant periodicity between of the fill fiber in alternating layers prevents the precursors generated during the chemical precursor infiltration process from easily diffusing into the center of the composite matrix. During chemical precursor infiltration, the ceramic precursor precursors react preferentially on the outer layers (those closer to outer surface 292 and the center AA') due to a less tortuous diffusion path and fill in the spaces between the fibers in these layers. This higher rate of reaction on the outermost layers prevents ingress of subsequent precursors into the center of the ceramic matrix composite. The reduced ability to infiltrate the central portion of the matrix produces a higher volume fraction of pores in the center of the composite. This density variation is reflected in the shading in FIG. 1. The shading gradually lightens in color from the outer surface to the center of the composite indicating that the center contains a larger relative volume fraction of porosity and consequently a lower material density. It also produces density differences between the outer regions of the composite (i.e., the outer and inner surfaces) and the central region of the composite. It is preferable to design composites where such density differences do not occur and where pores are absent thus providing the composite with improved properties and a longer life span.

SUMMARY

In one embodiment, a ceramic matrix composite laminate comprises a ceramic matrix that encapsulates a plurality of layers. Each layer comprises fibers. Each layer comprises a plurality of fill fibers and a plurality of warp fibers or a plurality of bias fibers. The outermost layer contains a different concentration of fibers per unit volume than a layer located near an interior of the ceramic matrix composite laminate. A gradient in the number of fibers exists between the outermost layer and the layer located at the interior of the ceramic matrix composite laminate, or a combination thereof. A combined ceramic matrix composite comprises a plurality of composite laminates; wherein each laminate has a different fiber concentration per unit volume from another laminate that it contacts.

In an embodiment, the fibers are ceramic fibers, carbon fibers, or a combination thereof.

In another embodiment, the ceramic matrix composite laminate is a deltoid shaped preform.

In yet another embodiment, the fibers in the outermost layer have a larger space between the fibers than a space between fibers located near the interior of the ceramic matrix composite laminate.

In yet another embodiment, the areal space between fill and warp fibers or the areal space between axial and bias fibers gradually decreases from the outermost layer to the layer located near the interior of the ceramic matrix composite laminate.

In yet another embodiment, the gradient is a linear gradient.

In yet another embodiment, the gradient is a curvilinear gradient.

In yet another embodiment, the curvilinear gradient follows a spline function having exponents between 2 and 5.

In yet another embodiment, the gradient in the number of fibers first increases and then decreases from the outermost layer to the layer located at the interior of the ceramic matrix composite laminate.

In yet another embodiment, the distance between fill fibers gradually decreases from the outermost layer to the layer located near the interior of the ceramic matrix composite laminate, while a distance between warp fibers remains constant from the outermost layer to the layer located near the interior of the ceramic matrix composite laminate.

In yet another embodiment, the distance between warp fibers gradually decreases from the outermost layer to the layer located near the interior of the ceramic matrix composite laminate, while a distance between fill fibers remains constant from the outermost layer to the layer located near the interior of the ceramic matrix composite laminate.

In yet another embodiment, the ceramic matrix comprises SiC, $Al_2O_3$, BN, $B_4C$, $Si_3N_4$, $MoSi_2$, $SiO_2$, SiOC, SiNC, and/or SiONC.

In yet another embodiment, the fibers comprise SiC.

In yet another embodiment, the matrix density at the outermost layer is similar to that near the interior of the ceramic matrix composite laminate.

In yet another embodiment, the matrix is substantially devoid of pores near the interior of the ceramic matrix composite laminate.

In an embodiment, a method for manufacturing a ceramic matrix composite comprises placing in a precursor infiltration chamber a laminate. The laminate comprises a plurality of layers that comprise fibers. Each layer comprises a plurality of fill fibers and a plurality of warp fibers or a plurality of axial fibers and a in plurality of bias fibers. The outermost layer contains a different concentration of fibers per unit area than a layer located near an interior of the ceramic matrix composite laminate. A gradient in the number of fibers exists between the outermost layer and the layer located at the interior of the ceramic matrix composite laminate. The plurality of layers is infiltrated with a precursor that comprises a ceramic precursor. A first laminate having a first fiber concentration gradient per unit volume is then bonded to a second laminate having a second fiber concentration gradient per unit volume.

In another embodiment, the matrix density at the outermost layer is similar to that near the interior of the ceramic matrix composite laminate.

In yet another embodiment, the areal space between fill and warp fibers gradually decreases from the outermost layer to the layer located near the interior of the ceramic matrix composite laminate.

In yet another embodiment, the fibers comprise SiC and wherein the ceramic matrix comprises SiC, $Al_2O_3$, BN, $B_4C$, $Si_3N_4$, $MoSi_2$, $SiO_2$, SiOC, SiNC, and/or SiONC.

In yet another embodiment, the distance between fill fibers gradually decreases from the outermost layer to the layer located near the interior of the ceramic matrix composite laminate, while a distance between warp fibers remains constant from the outermost layer to the layer located near the interior of the ceramic matrix composite laminate or wherein a distance between warp fibers gradually decreases from the outermost layer to the layer located near the interior of the ceramic matrix composite laminate, while a distance between fill fibers remains constant from the outermost layer to the layer located near the interior of the ceramic matrix composite laminate.

DETAILED DESCRIPTION

Pores

Figure 1:
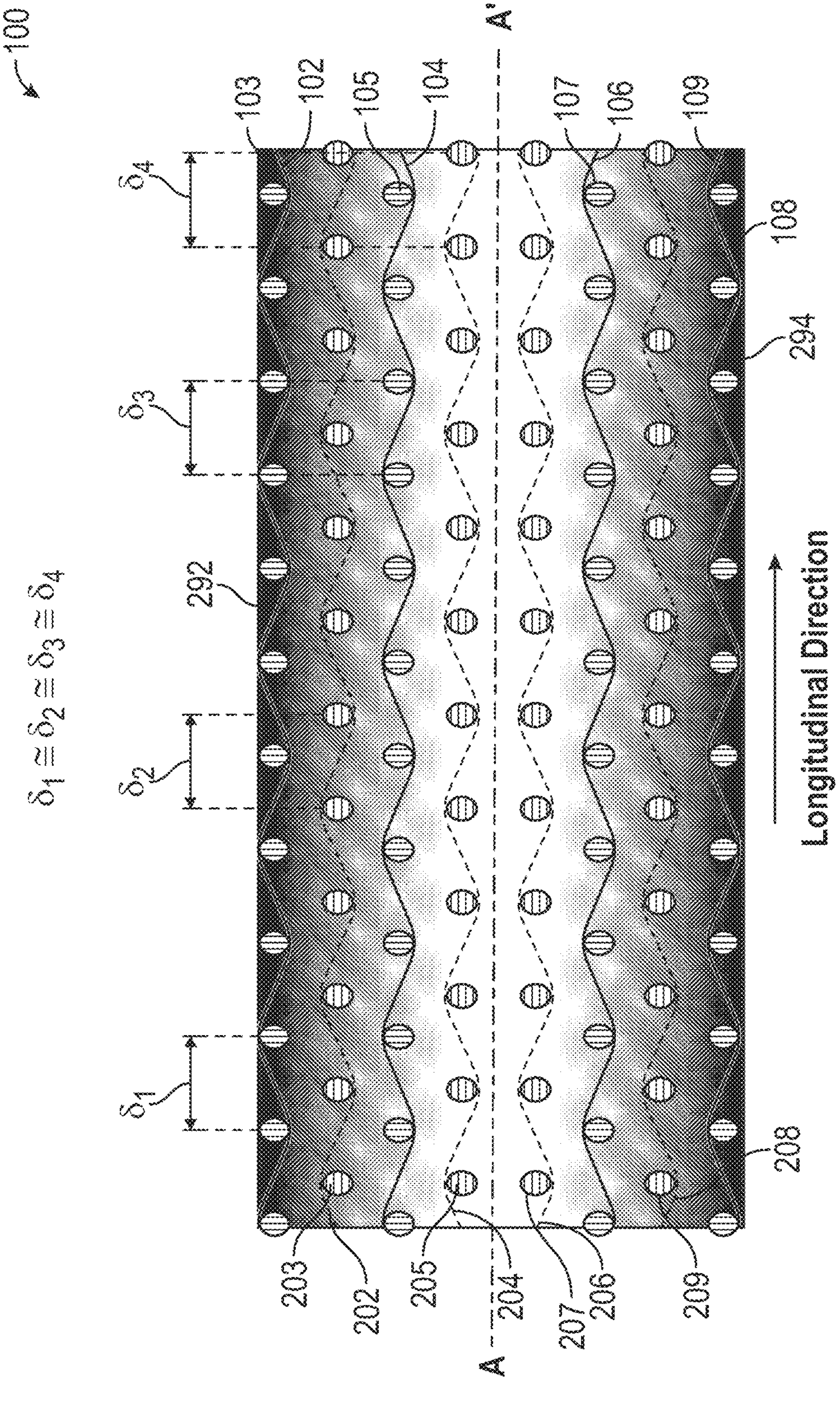
FIG. 1 (Prior Art)
FIG. 1 is a schematic depiction of a conventional ceramic matrix composite.

A pore is defined as the space between the tows. A tow comprises a plurality of filaments. In this disclosure the term "fiber" is used interchangeably with the term "tow". The spaces between the filaments within the tow is not a pore. The distribution of pore sizes can be tailored to facilitate more complete precursor infiltration to form a ceramic matrix composite with a uniform matrix density through the composite. Pores are also sometimes referred to as voids and these terms are used interchangeably in this disclosure.

Matrix Density

The matrix density may also be referred to as the bulk density. The matrix density is the density of the material considered to be part of the matrix. The matrix includes the material of the matrix (such as for example, SiC) and pores present in this matrix material. Pores are spaces between the tows where there is no matrix material (but where the presence of the matrix material is desired). The matrix volume fraction therefore is the fraction of the matrix material divided by the total volume of the ceramic matrix composite that could be occupied by the matrix material. It is generally desirable for the matrix volume fraction to be as high as possible and for the pore volume fraction to be minimized as much as possible. The maximum matrix material volume fraction would be that obtained by subtracting the volume of the tows from the total volume of the ceramic matrix composite.

Layers, Sub-Laminates, Preforms and Ceramic Matrix Composites

A woven layer comprises a weaving pattern in a single plane (linear or curvilinear) in which the warp and fill fibers alternate. A braided layer comprises a braided pattern in which bias fibers alternate. The braided layer may include biaxial or triaxial fibers as detailed below.

For purposes of this disclosure, a plurality of layers stacked one atop another are termed a sub-laminate or a laminate. The term sub-laminate or laminate are used interchangeably. The laminate may have a gradient in pore sizes or in fiber concentration per unit volume prior to precursor (or matrix) infiltration. A plurality of laminates may be disposed next to one another to form a preform. The plurality of laminates may have a plurality of gradients in pore sizes or in fiber concentration per unit volume. Each laminate may have a gradient in pore sizes (or in fiber concentration per unit volume) that is different from a neighboring gradient. A gradient is the increase or decrease in the magnitude of pore sizes (or of fiber concentration per unit volume) observed in passing from one point to another. The increase or decrease in the magnitude of pore sizes (or of fiber concentration per unit volume) observed in passing from one point to another divided by the thickness of the layer or sub-laminate is defined as the rate of gradient change. When the preform (also known as a plurality of laminates) is infiltrated with a ceramic it forms a combined composite laminate.

Braided Preforms and Composites

Braided composites are characterized by the organization of their fibers in such a way that they are interlaced diagonally about an axis. Braided preforms for composites consist of two (or more) interlaced sets of tows. Biaxial braids consist of two sets of tows called bias tows (not shown) while and triaxial braids (shown in FIG. 10) include a third set of tows called axial tows in addition to the two sets of bias tows. A variety of shapes can be fabricated for composite applications, from hollow tubular (with in-laid, non-interlaced tows) to solid sections, including I-beams. Unlike woven preforms, braided structures can be directly laid on a three-dimensional mandrel by passing it through the braiding ring and hence producing seamless, near-net shapes.

Disclosed herein are ceramic matrix composites that comprise a plurality of woven layers where the spacing between fill fibers varies in successive layers with their distance from the outer surfaces to the center of the composite. The plurality of woven layers are also called a sub-laminate. Disclosed herein too is a combined composite laminate that comprises a plurality of sub-laminates (each of which have a different gradient in fiber concentration per unit volume) into which a precursor has been infiltrated to form the matrix.

In an embodiment, this variation may be described as a gradient in fiber concentration per unit volume from the outer surfaces to the center of the composite. The term "per unit volume" is referred to as a standard of unit of volume (for example 1 cubic centimeter) that does not vary from one layer to another. The gradient in fiber concentration varies from the outer surface or the inner surface to the composite center. By using a greater distance between fibers in the outer layers relative to the distance between fibers in the inner layers, the precursor used in the infiltration process encounter less resistance to penetrating the innermost layers and thus enable a CMC with a more uniform matrix density. The matrix density referred to herein is the bulk density of the ceramic matrix. This results in a more uniform distribution of matrix material through thicker laminates. Put another way, by using variable spacing between the fill fibers in successive layers, additional pathways to the ingress of the precursors are provided in the laminate which results in a uniform distribution of matrix material. This prevents the formation of heterogenous zones that contain pores in the central region of the ceramic matrix composite. It also prevents the formation of regions that have a lower concentration of the ceramic material when compared with regions near the outer surface of the ceramic matrix composite.

Disclosed herein too is a two-dimensional (2D) or three-dimensional (3D) combined composite laminate that comprises a plurality of laminates having different gradients in fiber concentration per unit volume. In an embodiment, the combined composite laminate has a plurality of gradients in fiber concentration each of which has a gradient that is inverted or has an opposed slope when compared with a gradient in a neighboring laminate. Different gradients in the fiber concentration per unit volume may be used in articles such as the airfoil section and in the adjacent platform in order to achieve a substantially similar matrix density in all of the regions of the CMC with this type of complex shape. It is possible that the matrix density gradient would not be exactly identical in adjacent regions but it is desirable to have as uniform a matrix density as possible so as to produce more homogenous properties.

As noted above, the combined composite laminate is a 2D or 3D laminate. Two dimensional (2D) composites can be manufactured by 2D weaving, 2D braiding, 2D knitting, and so on. 2D woven composites are manufactured by interlacing fibers or tows in a weaving loom. Tows are divided into two components—one termed the warp tow, running along the length of the loom, and the other is the weft tow, running in the cross direction. 2D braids are detailed below in the section on braided preforms. 2D composites do not use z-tows. As noted below z-tows travel in the through-thickness direction of the preform.

3D combined composite laminates comprise fiber preforms constructed from yarns or tows arranged into complex three-dimensional structures. These can be created from a 3D weaving process, a 3D knitting process, a 3D braiding process, or a 3D lay of short fibers. 3D woven preforms are produced on a special 3D weaving loom. 3D woven preforms include 3D orthogonal woven preforms and 3D angle-interlock preforms. The architecture of the 3D orthogonal woven preform comprises three different sets of tows; warp tows (y-tows), weft tows (x-tows), and (z-tows). Z-tows are placed in the through-thickness direction of the preform.

Figure 3:
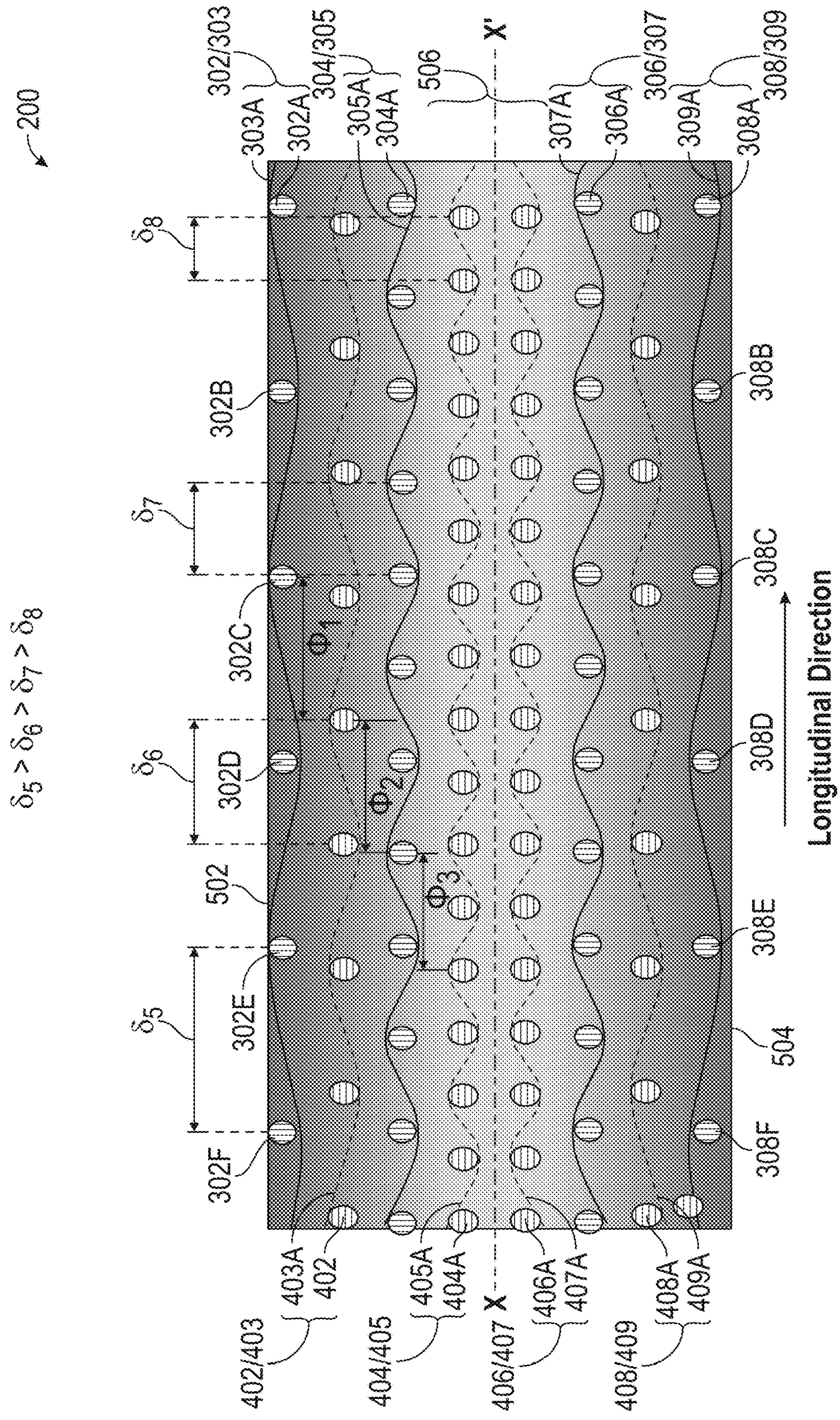
FIG. 3 is a depiction (in the longitudinal direction) of one exemplary embodiment of a ceramic matrix composite that has a gradient in fiber concentration per unit area from the outer surface or the inner surface to the center of the composite.

FIG. 3 is a depiction (in the longitudinal direction—where the longitudinal direction is in the plane of the paper) of one exemplary embodiment of a ceramic matrix composite 200 that has a gradient in fiber concentration from the outer surface 502 (or the inner surface 504) to the center 506 of the composite. While FIG. 3 (and the other figures in this disclosure) discusses the center 506 of the composite, it is to be noted that the gradient in fiber concentration can exist from an outer surface 502 (or the inner surface 504) to the interior of the composite. The interior of the composite at which there is a region of mutual matrix density may not necessarily be at the geometric center 506 of the composite. This is detailed later.

It is to be noted that the terms "outer surface" and "inner surface" do not necessarily imply that one surface is an outer surface of a device while the other surface forms an inner surface of the device. The terms are used to denote opposing surfaces during the manufacture of the laminate. Both surfaces may be the outer surfaces of the laminate during a precursor infiltration process. When a device is manufactured using the laminate, both the outer and inner surfaces may lie in the interior of the device, both may form outer surfaces of the device or one surface may lie at the outer surface of the device, while the other may lie at the inner surface of the device. The terms "center of the composite" or "center of the laminate" all refer to an interior region of the composite or laminate. In other words, by using lower areal weight fabric toward the mold surfaces (the outer surfaces of the laminate) than at the center, higher precursor infiltration may be obtained toward the laminate center. This improves matrix uniformity at the composite (laminate) center when compared with conventional laminates that contain lower amounts of material at the composite center than at the outer surfaces. This is reflected in the shading in the FIGS. 3, 4 and 5, where the darker shading extends from the outer surfaces to the center of the composite (the laminate). The uniformly dark shading shows that there are no significant density variations in the matrix of the ceramic matrix composite 200 from the outer surface to the center. The is preferably less than 30% matrix density variation, preferably less than 20% matrix density variation and preferably less than 10% matrix variation from the outer surfaces to the center of the ceramic matrix composite 200 (i.e., the laminate).

The ceramic matrix composite 200 comprises a plurality of layers (first layer 302/303; second layer 402/403, third layer 304/305 and fourth layer 404/405) from the outer surface 502 to the center 506 of the composite. Similarly, the composite 200 contains a plurality of layers (first layer 308/309; second layer 408/409, third layer 306/307 and fourth layer 406/407) from the inner surface 504 to the center 506 of the composite. As may be seen in the FIG. 3, the distance between the fill fibers decreases with each layer from the outer and inner surfaces 502, 504 respectively to the center of the composite 506.

Figure 2:
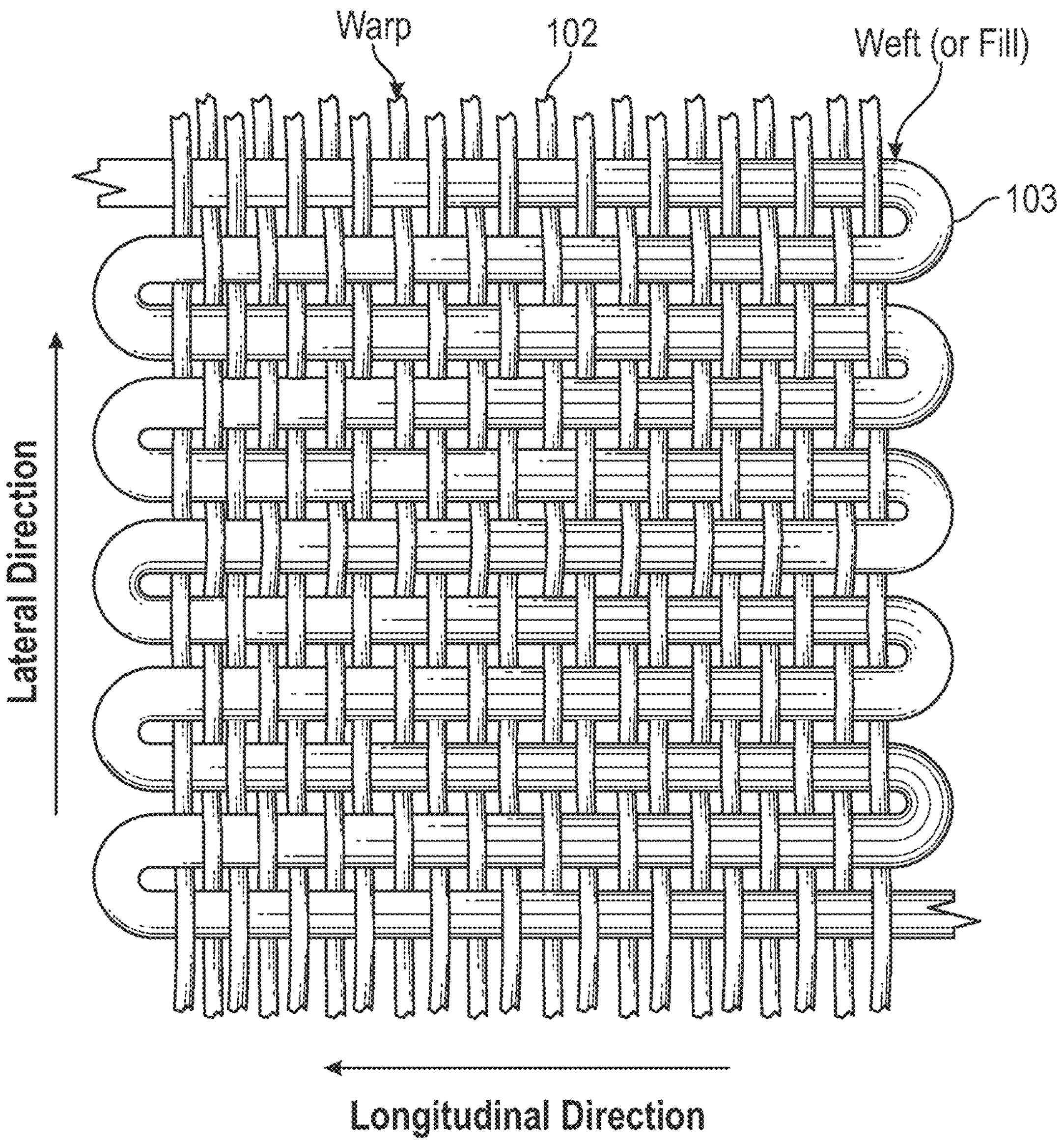
FIG. 2 is a top view of a first woven layer that lies at the outer surface of a ceramic matrix composite.

Each layer contains a plurality of fill fibers and warp fibers that are woven with each other. While each of the figures disclosed herein contains layers that comprise woven fibers, it is possible to have layers of non-woven fibers interspersed between layers of woven fibers. In order to facilitate an understanding of the figures, the successive fill fibers in a layer are designated with alphabets. For example in the FIG. 3 (when viewed in the longitudinal direction), the only warp fiber is designated as 303A, while the successive fill fibers are designated as 302A, 302B, 302C, 302D, 302E and 302F, and so on. In the inner surface 504, the first layer 308/309 has a warp fiber denoted as 309A, while the successive fill fibers are designated 308A, 308B, 308C, 308D, 308E, 208F, and so on. The warp fibers in successive layers shown in the FIG. 2 are 403A, 305A, 405A, 307A, 407A, 309A, 409A, and so on.

Figure 4:
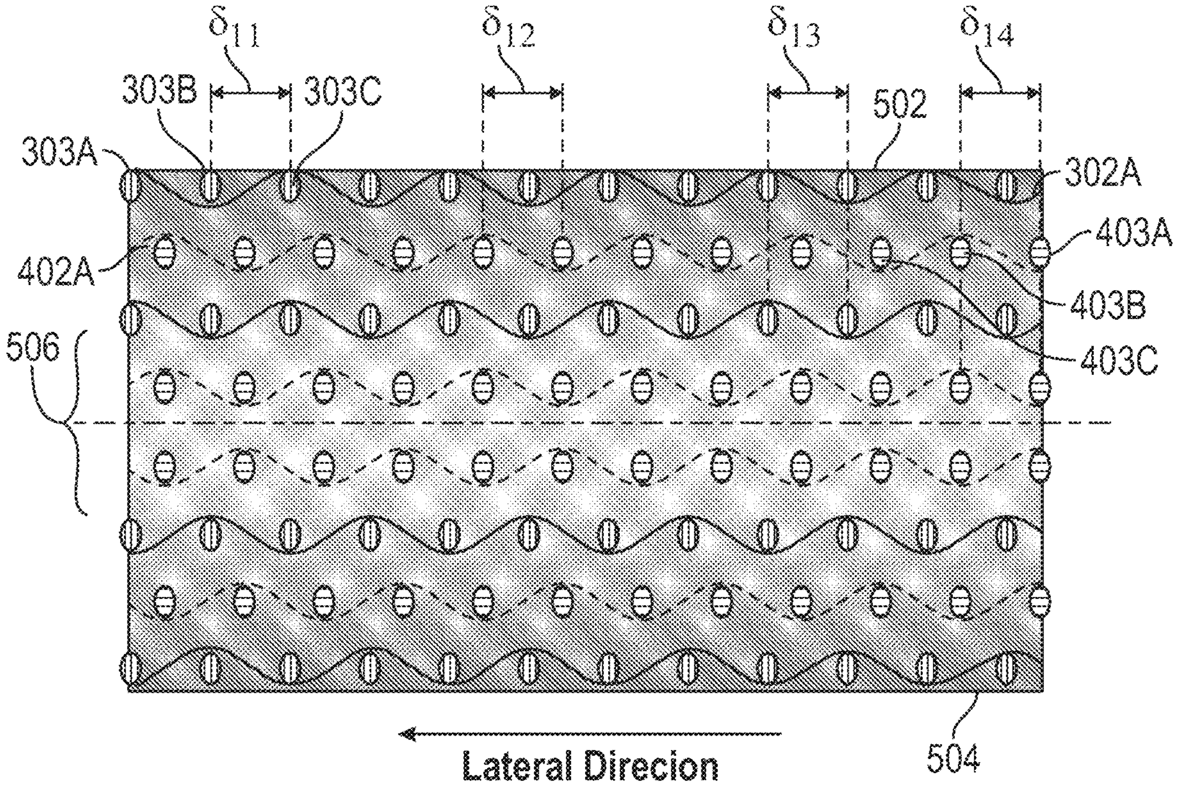
FIG. 4 is a depiction (in the lateral direction) of one exemplary embodiment of the ceramic matrix composite of the FIG. 3.
Figure 5:
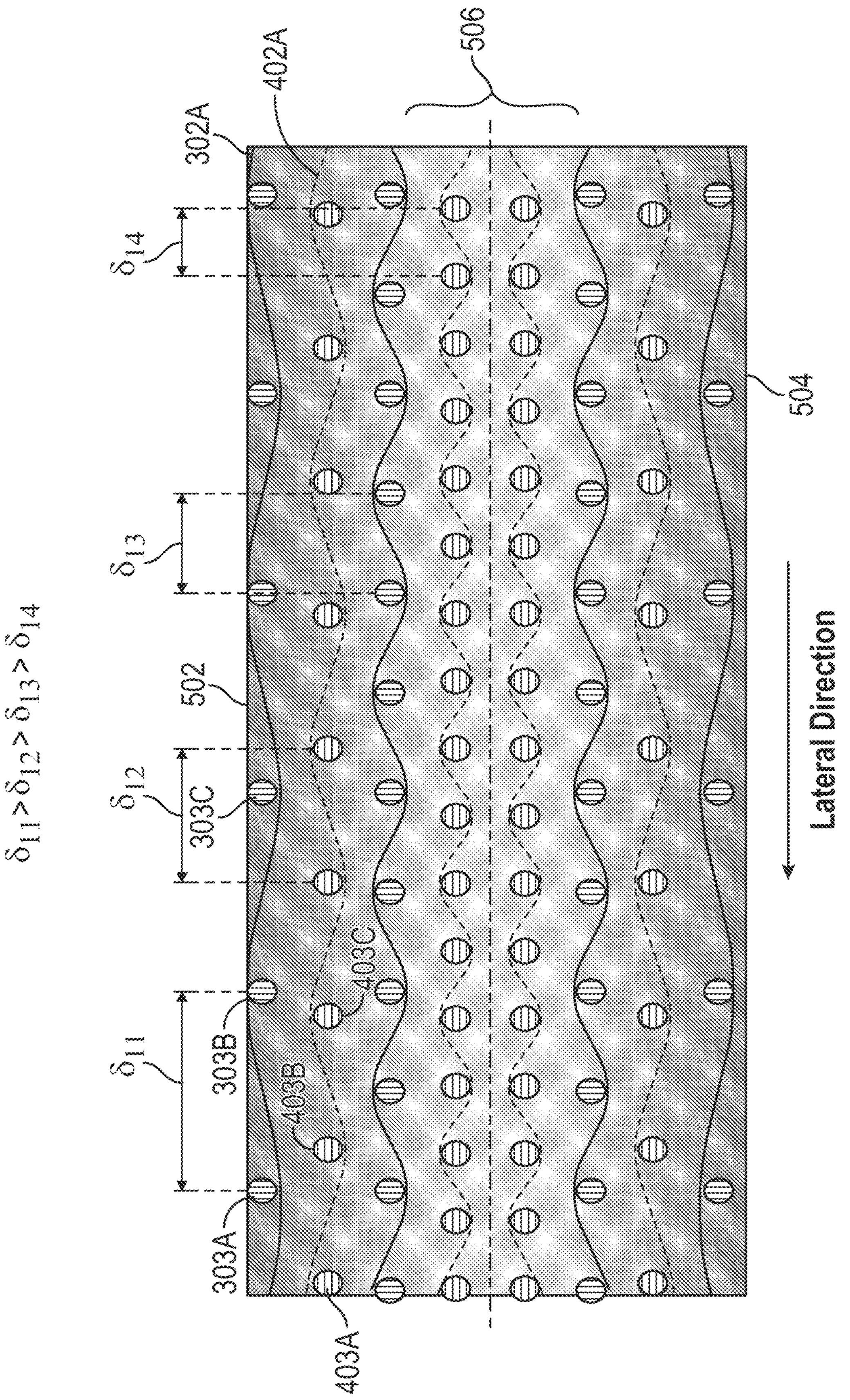
FIG. 5 is a depiction (in the lateral direction) of another exemplary embodiment of the ceramic matrix composite of the FIG. 3.

FIGS. 4 and 5 depict a view in the lateral direction for the FIG. 3. As detailed later, in the FIG. 4 the warp fibers are equidistantly spaced, while in the FIG. 5 the warp fibers are not equidistantly spaced. The FIGS. 4 and 5 depict a plurality of the warp fibers 303A, 303B, 303C, 303C, and so on.

With reference to the FIG. 3, the first layer 302/303 has a periodic spacing of $\delta_5$ between adjacent fill fibers 302 in the same layer, while the second layer 402/403 has a periodic spacing of $\delta_6$ between adjacent fill fibers 402 in the same layer. It can be seen that $\delta_5$ is greater than $\delta_6$. The third layer 304/305 has a periodic spacing of $\delta_7$ between adjacent fill fibers 304 in the same layer, while the fourth layer 406/407 has a periodic spacing of $\delta_8$ between adjacent fill fibers 406 in the same layer. It may be seen that $\delta_6$ is greater than $\delta_7$, which is in turn greater than $\delta_8$. The same feature of decreasing spacing between the fill fibers of successive layers may be seen as one traverses the laminate from the inner surface 504 to the center 506 of the composite 200.

As may be seen in the FIG. 3 (when viewed in the longitudinal direction), the fill fibers in each layer are periodically arranged, but the periodicity of the fill fibers in each layer are different from the periodicity neighboring layers. The periodicity of the fill fibers in each layer decreases from the outer surface of the ceramic composite to the center. This trend (of decreasing periodicity) may also be seen in the warp fibers (when viewed in the lateral direction) as will be detailed in the FIG. 5.

While the periodicity is reduced for each successive layer from outer surface to the center of the ceramic composite, the phase difference between successive layers is reduced with each layer from the outer surface to the center of the ceramic matrix. For example (with reference to the FIG. 3), the phase difference Di between peaks of the warp fiber 303 and 403 (in the first and second layers respectively) is 30 to 60 degrees, while the phase difference $\varphi_2$ between the peaks of the warp fiber 403 and 305 (in the second and third layers respectively) is 25 to 45 degrees, while the phase difference $\varphi_3$ between the warp fiber 305 and the fiber 405 (in the third and fourth layers) is 20 to 30 degrees. In other words, $\varphi_1 > \varphi_2 > \varphi_3$, and so on. The phase difference and the periodicity may be selected to improve ingress of the ceramic precursors into the center of the ceramic composite. They may also be selected to improve properties such as impact resistance, ductility, tensile yield, and the like. The phase difference and the periodicity between successive layers may be selected to increase or decrease the rate of ingress of precursors during chemical vapor deposition, polymer infiltration pyrolysis, melt infiltration, and the like. This may be done to effect the density of the matrix from the outer surface to the interior of the ceramic composite. As noted above, it is desirable to have minimal ceramic matrix density difference between the outer surface and the interior of the ceramic composite.

In another embodiment (not shown), while the periodicity is reduced for each successive layer from outer surface to the center of the ceramic composite the phase difference between successive layers does not change from the outer surface to the center of the ceramic matrix. In other words, the phase difference $\varphi_1$ between peaks of the warp fiber in the first, second, third layers, and so on, does not change from the outer surface to the interior of the ceramic composite. In other words, $\varphi_1=\varphi_2=\varphi_3$, and so on. Additional details are provided below.

The periodicity and phase differences between the warp fibers in successive layers and between the fill fibers in successive layers may be selected such that there is a reduction in both periodicity and phase difference from an outer surface to the center of the ceramic composite. This embodiment is depicted in the FIG. 3 and FIG. 5.

In another embodiment, the periodicity and phase difference for the warp fibers may decrease for each successive layer (from the outer surface to the center of the ceramic composite), while the fill fibers may have a periodicity and phase difference that does not change (i.e., it remains constant) for each successive layer). This embodiment is depicted in the FIG. 3 and FIG. 4.

It is to be noted that while the FIG. 3 depicts the fill fibers in each layer to be periodically spaced, the fill fibers in each layer may be aperiodically spaced. The ingress of the precursor will be improved so long as the average spacing between successive layers decreases with the distance of the layer from the outer surface (either the outer surface or the inner surface) of the composite 200. In other words, the ingress of precursor is improved so long as the average spacing (periodic spacing or aperiodic spacing) decreases with increasing distance from the outer surface of the composite (also called a laminate).

In an embodiment, the spacing successive warp fibers in each of the layers (302/303, 402/403, 304/305, and 404/405) in the lateral direction (the direction into the plane of the paper) may remain constant, may decrease or may increase from the outer surface (the outer surface 502 and/or the inner surface 504) to the center 506 of the composite 200. FIG. 4 depicts one embodiment where the warp fibers (303A, 303B, 303C, and so on in the first layer; 403A, 403B, 403C, and so on in the second layer) in the respective layers are periodically spaced at a constant distance from each other. FIG. 4 is a depiction of a section of the composite of the FIG. 3 (when viewed in the lateral direction). The lateral direction is perpendicular to the longitudinal direction depicted in the FIG. 3. From the FIG. 4, it may be seen that the spacing 811, 812, 813 and 814 between the warp fibers of the first layer (the outermost layer as measured from the outer surface), the second layer, the third layer and the fourth layer (the innermost layer as measured from the outer surface) respectively are all constant.

While the FIGS. 3 and 4 show that the central region 506 is equidistant from the outermost layers on opposing sides of the laminate (the outer surface and the inner surface) and a gradient in fiber concentration from the outer surface to the central region is symmetric with a gradient from the inner surface to the central region, this may not always be practical. For example, the precursor infusion characteristics from the outer surface to the central region may be different from the inner surface to the central region. These differences in the precursor infusion characteristics may arise because geometric characteristics such as thickness or orientation of features in the laminate.

Figure 8:
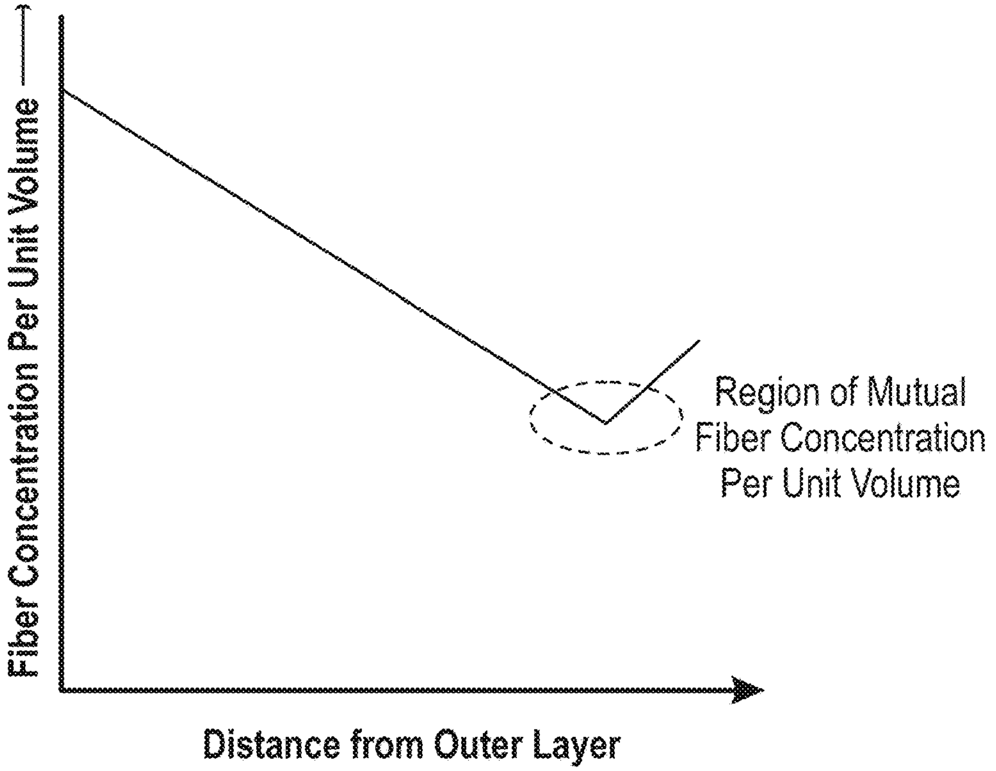
FIG. 8 is a graph that depicts variation in fiber concentration per unit volume with distance from a laminate surface; the graph exemplifies a laminate that has a region of lowest fiber concentration per unit volume away from the geometrical center of the laminate.

These differences may result in using different gradients in fiber concentration per unit volume from the outer surface to the interior of the laminate versus from the inner surface to the interior of the laminate and may result in a region of mutual fiber concentration per unit volume being located at a point that is not in the geometric center of the laminate. This may be seen in the FIG. 8, where a region of mutual fiber concentration is closer to the inner surface than to the outer surface. FIG. 8 is a graph that shows fiber concentration per unit volume with distance from the outer surface. In other words, the region of mutual fiber concentration may not always be at the geometric center of the composite. The region of mutual fiber concentration may be closer to the outer surface than to the inner surface, closer to the inner surface than the outer surface, or equidistant from both.

In an embodiment, a gradient in fiber spacing between adjacent layers could be adjusted to facilitate homogenization of the matrix density similar to that illustrated in the FIGS. 3 to 5. In other words, the gradient in fiber concentration per unit volume from the outer surface to the center may be chosen to be different from the gradient in fiber concentration per unit volume from the inner surface to the center so that the matrix density is substantially uniform throughout the composite. The gradient in fiber concentration in a part of the preform may be varied from that in other parts of the preform to effect homogenization of the matrix density throughout the composite.

FIG. 5 is another depiction of a section of the composite of the FIG. 3 (when viewed in the lateral direction). The lateral direction is perpendicular to the longitudinal direction depicted in the FIG. 3. From the FIG. 5 it may be seen that the spacing 811 between the warp fibers (303A, 303B, 303C, and so on) of the first layer is larger than the spacing 812 between the warp fibers (403A, 403B, 403C, and so on) of the second layer. From the FIG. 5, it may be seen that the spacing 811, 812, 813 and 814 between the warp fibers of the first layer (the outermost layer as measured from the outer surface), the second layer, the third layer and the fourth layer (the innermost layer as measured from the outer surface) respectively progressively decreases from the outer surface 502 to the center of the composite 506. The same trend in warp fiber spacing can be seen from the inner surface 504 to the center of the composite 506.

Figure 6:
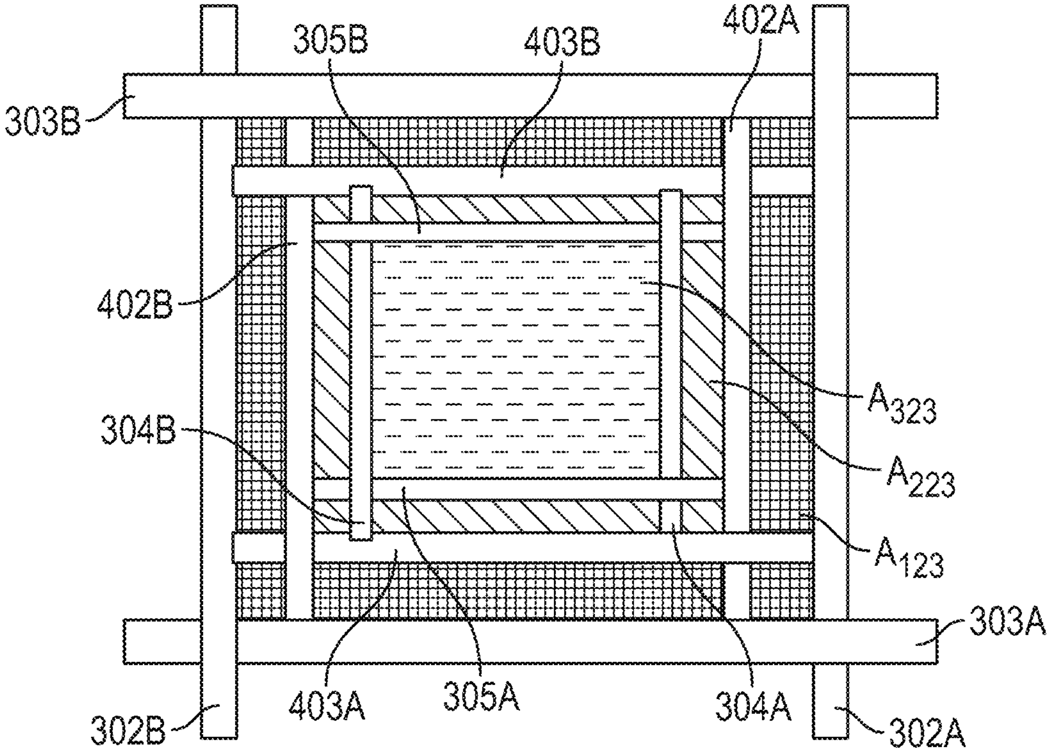
FIG. 6 is a top view depiction of one exemplary embodiment of a plurality of 1 pair of fill fibers and 1 pair of warp fibers for 3 successive layers from the outermost layer towards the center of the laminate.

FIG. 6 is a top view of the ceramic composite and depicts the areal space between 1 pair of fill fibers and 1 pair of warp fibers in each layer for the layers 302/303, 402/403 and 304/305 respectively as seen in the FIGS. 4 and 5. The FIG. 6 shows the areal spaces (of the different layers) as having a single vertical axis about which the fibers of each layer are equidistantly spaced. In other words, the areal spaces are concentrically located. However, the areal space between the fibers of the first layer may not be located about the same axis as the areal space between the fibers of the second layer. In other words, the areal spaced are not necessarily concentrically located but may be eccentrically located as well. In practice, each layer in the laminate will tend to nest to some degree during manufacture, so that the grouped fibers in each layer may not be exactly above/below each other in all cases.

While the FIG. 6 shows each pair of fill fibers and warp fibers being parallel to a neighboring pair of fill and warp fibers, this may not necessarily be the case. In an embodiment, each succeeding pair of fill and warp fibers may be inclined with respect to a pair of fill and warp fibers in a neighboring layer. For example, each layer may be rotated by an angle with respect to the next neighboring layer as one travels from the outermost layer to the innermost layer. This rotation of each succeeding layer with respect to the preceding layer would promote the fill and warp fibers in one layer to not be parallel to the fill and warp fibers in a succeeding neighboring layer.

The area $A_{123}$ is encompassed by two pairs of warp and fill fibers is shown in the FIG. 6. It is the largest area space between a pair of warp fibers (302A, 302B) and a pair of fill fibers (303A, 303B) in the first layer 302/303. The area $A_{223}$ is the area encompassed by a pair of warp fibers and a pair of fill fibers in the second layer 402/403, while the area $A_{323}$ is the area encompassed by a pair of warp fibers and a pair of fill fibers in the third layer 304/305. From the FIG. 6 it may be seen that the areal spacing $A_{123}$ is greater than $A_{223}$, which is in turn greater than $A_{323}$. As the distance between the outer surface and the center layer increases the areal spacing between the fill fibers and the warp fibers decreases. The tows in each layer do not necessarily comprise the same number of filaments.

Figure 7:
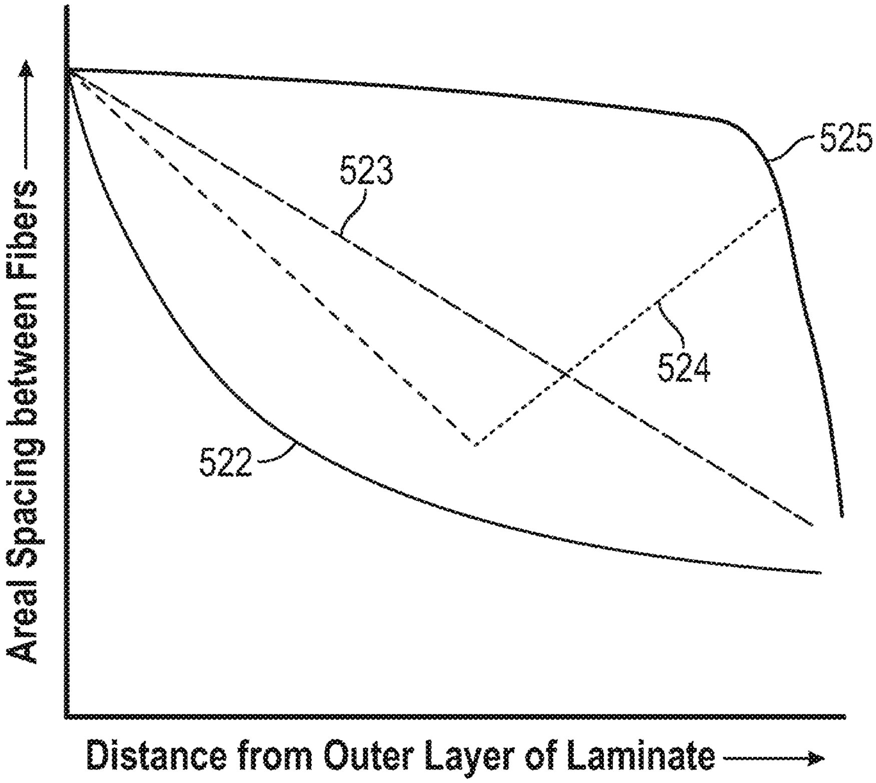
FIG. 7 is a graph that depicts the different gradients that may be employed in the ceramic composite when traversing the ceramic composite from one outer surface to an opposing outer surface.

This trend in changing areal space with distance from the outer surface of the ceramic composite laminate may be represented graphically as seen in the FIG. 7. FIG. 7 depicts a variety of ways in which the variation of areal spacing between fibers can change with distance from one outer to an opposing outer surface of the ceramic composite. The gradient in fiber concentration is represented Line 522 shows that the areal space decreases in a curvilinear fashion with distance from one outer surface to an opposing outer surface of the ceramic composite, while line 523 shows that the areal space decreases in linear fashion with distance from the outer surfaces of the ceramic composite. Line 525 shows that the areal space decreases in asymptotic fashion with distance from one of outer surfaces of the ceramic composite. The distance between the fibers of successive layers may therefore vary in linear fashion or a curvilinear fashion with distance from the outer surfaces of the ceramic composite (laminate). The variation in fiber concentration is also termed a gradient. The curvilinear gradient may include a spline function where the exponent may vary from 2 to 5.

The gradient in fiber concentration with distance typically increases with distance from the outer surface (i.e., the amount of fibers increase per unit volume with distance from the outer surface). However, the gradient may also decrease with increasing distance from the outer surface. This may be seen in the case of curve 524 in the FIG. 7, where the areal space first decreases but then increases.

The gradient in fiber concentration is produced because the distance between the fill fibers varies from one layer to another, the distance between the warp fibers varies from one layer to another, or because the distance between the warp fibers and the distance between the fill fibers varies from one layer to the other. In an embodiment, the distance between either warp fibers or the distance between fill fibers varies from layer to layer, while the distance between other set of fibers remains constant irrespective of the distance of the layer from the outer surface of the composite. For example, the distance between warp fibers is gradually reduced from layer to layer while the distance between the fill fibers remains constant or vice versa.

In another embodiment, the distance between warp fibers and the distance between fill fibers is gradually reduced from layer to layer. In yet another embodiment, the distance between warp fibers is gradually reduced from layer to layer (with distance from the outer surface), while the distance between fill fibers is gradually increased from layer to layer (with distance from the outer surface). Any combination of the foregoing embodiments may also be used.

In an embodiment, areal density of the fibers is adjusted to allow ready ingress of precursors to an encapsulated design detail, such as a “deltoid” or “noodle” preform. Deltoid noodles (also referred to as a “deltoid filler”) are used for filling closed cavity sections (or “deltoid”) of composite structures. The deltoid noodle is made from a unidirectional or woven graphite-fiber prepreg and is processed to make it conformal to the manufacturing process through the deltoid noodles ability to flow into the deltoid of composite structures. This ability to flow and fill the deltoid areas causes it to accommodate tooling mismatches during manufacturing of the composite structure that utilize a deltoid noodle. Further, the deltoid noodle is rolled into a cylinder to create a continuous strand and includes a chopped or sliced center portion that allows the deltoid noodle to flow and conform to the deltoid in the composite structure. In another embodiment, one or more non-woven layers may be interspersed with woven layers.

In one embodiment, in one method of manufacturing the ceramic composite (the laminate), preform layers that may include woven fibers are disposed one atop one another such that the areal spacing between fibers decreases from the outer surface to the center of the laminate. The fibers can be ceramic fibers. Ceramic fibers of preform layers as set forth herein can have a polycrystalline structure. In one embodiment, ceramic fibers of preform layers can include a non-stoichiometric chemical composition or can include a stoichiometric chemical composition.

In one embodiment, ceramic fibers of preform layers can include an inhomogeneous chemical composition. In one embodiment ceramic fibers of preform layers are single crystal fibers, polycrystalline fibers or by amorphous fibers. In an embodiment, ceramic fibers of the preform layers can comprise silicon carbide (SIC), carbon, alumina ($Al_2O_3$), mullite ($Al_2O_3$—$SiO_2$), or a combination thereof. The preform layers may be stacked together to obtain the gradient in fiber concentration detailed above in the FIGS. 3, 4, 5, 6 and 7. The preform may then be subject to forces that produce a desired shape. The laminated preform is then subjected to chemical precursor infiltration (in a chemical vapor infiltration (CVI) treatment chamber reactor) to encapsulate the fibers in a ceramic matrix. The laminated perform may also be subjected to other processes such as polymer infiltration pyrolysis or melt infiltration to encapsulate the fibers in a ceramic matrix.

An appropriate precursor for matrix infiltration can include, for example, any one of, or a mixture of two or more of, hydrogen, methyl-trichlorosilane, boron trichloride, ammonia, trichlorosilane, and a hydrocarbon gas. An appropriate precursor can include, e.g., any silane containing precursor as well as any siloxane, silazane, or other silicon containing precursor. The precursor within the treatment chamber or reactor can be devoid of a primary flow direction. Providing a precursor within a chamber or reactor to be devoid of a primary flow direction can reduce processing cost.

The temperature within the manufacturing chamber can be raised, and the reactant precursors can undergo a chemical reaction at high temperature. During a reaction, a matrix coating can be formed on surfaces of fibers of the preform. Where fibers of a preform as set forth herein are provided by a SiC fiber a matrix consisting of, e.g., SiC, $Al_2O_3$, BN, $B_4C$, $Si_3N_4$, $MoSi_2$, $SiO_2$, SiOC, SiNC, and/or SiONC can be formed on fibers of the preform to define a densified CMC structure.

The use of arranging the layers as shown in the FIGS. 3, 4, 5, 6 and 7 produces a uniform concentration of matrix material near the outer surface of the composite as well as in the center of the composite. The formation of pores and other stress concentrators are reduced in the center of the composite, when the layers in the preform are arranged to have a gradient in fiber concentration from the outer surface to the center of the ceramic matrix composite. As noted above, the gradient in fiber concentration increases from the outer surface to the interior of the composite (there is a greater concentration of fibers in the center of the composite relative to the concentration near the outer surface). The formation of pores and other stress concentrators are reduced in the center of the composite, when the layers in the preform are arranged to have the gradient in fiber concentration detailed above.

In an embodiment, a plurality of laminates having different gradients in fiber concentration may be used in a combined composite laminate. The combined composite laminate may comprise a first laminate having a first gradient in fiber concentration, a second laminate comprising a second gradient in fiber concentration, a third laminate comprising a third gradient in fiber concentration, and so on. A combined composite laminate containing 3 laminates each having a different fiber gradient is shown in the FIG. 9A.

Figure 9A:
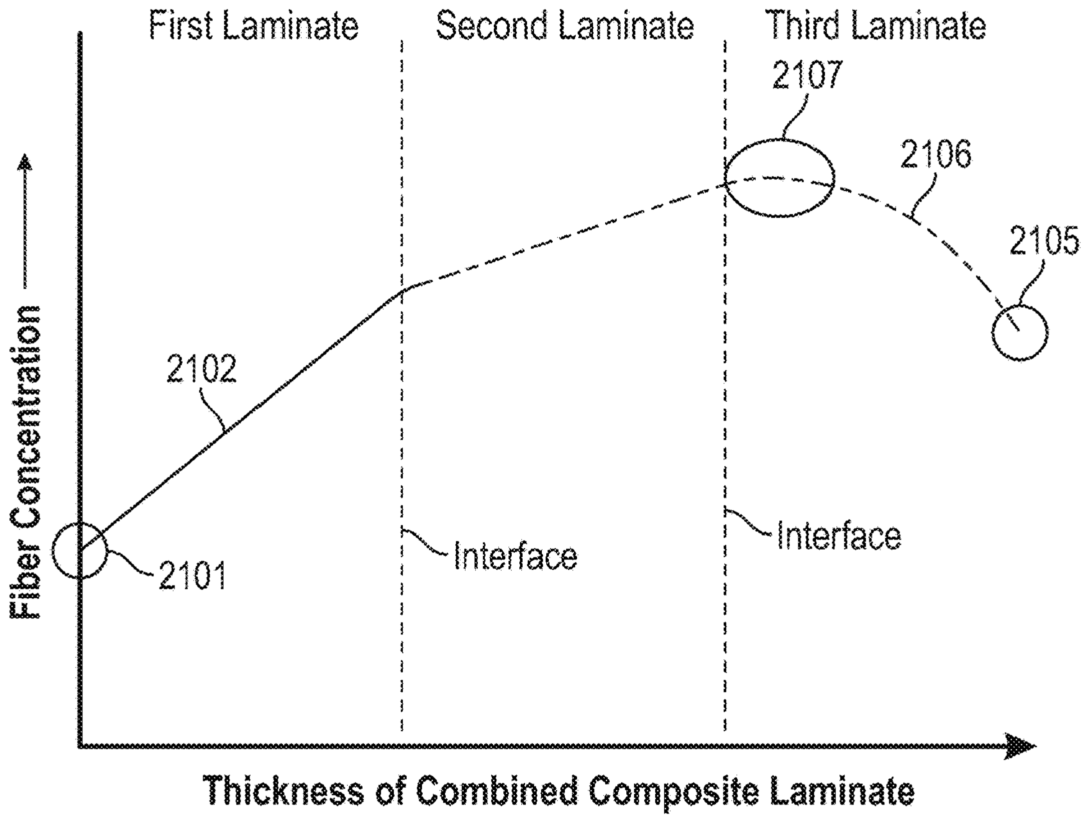
FIG. 9A is a graph that shows the variation in fiber concentration per unit area when a plurality of laminates are joined together to form a preform.

FIG. 9A is a graph that displays gradients in fiber concentration in a combined composite laminate that comprises 3 different laminates—a first laminate, a second laminate and a third laminate. Each of the laminates comprises a plurality of layers. In order for the matrix density through the thickness of each of the laminates to be substantially similar, it is desirable for the fiber concentration to be lowest at the exterior portions of the combined composite laminate (represented by numerals 2101 and 2105 and highest in the interior (represented by numeral 2107).

The combined composite laminate is manufactured by combining the individual laminates together in the preform stage and subjecting them to vapor infiltration. The individual laminates may be joined together using a polymeric solution. From the FIG. 9A it may be seen that the fiber concentration per unit volume is lowest at the exterior of the first and third laminates as seen in circles 2101 and 2105 respectively. The fiber concentration in each laminate per unit volume may vary in a linear or curvilinear fashion. In the first laminate the fiber concentration increases from the exterior of the first laminate to the interface between the first laminate and the second laminate as represented by the line 2102. The fiber concentration per unit volume at the interface (of the first laminate and the second laminate) may substantially be the same.

In the second laminate, there is an increase in fiber concentration from the interface of the first laminate with the second laminate to the interface of the second laminate with the third laminate as represented by line 2104. The line 2104 has a different slope from line 2102. The slope of line 2104 can be greater or less than the slope of line 2102.

In the third laminate, there is first an increase in fiber concentration with increasing combined composite laminate thickness to a region of maximum fiber concentration (represented by numeral 2107) followed by a decrease in fiber concentration (with combined composite laminate thickness) to the opposing exterior of the third laminate 2105. While the maxima in fiber concentration in the FIG. 9A is located in the third laminate, it may exist in the interior of the combined composite laminate in any one of the laminates.

In the FIG. 9A it may be seen that there are regions of mutual fiber concentration at the interface of the first laminate and the second laminate and at the interface of the second laminate and the third laminate. This may not need to be so. For example, there may be a discontinuity in fiber concentration at the interfaces of the respective laminates.

While the FIG. 9A depicts the variation in fiber concentration in 3 adjacent laminates, it is possible to have many more than three laminates in contact with each other. In an embodiment, there may be "n" different laminates in a combined composite laminate, where n is an integer number than can be 2 or greater, 3 or greater, 5 or greater, 10 or greater, 30 or greater, and so on.

From the FIG. 9A it may be seen that the gradient in fiber concentration in the first laminate is different from that of the second and third laminates. Similarly, the gradient in fiber concentration in the second laminate is different from that of the first and third laminates, while the gradient in fiber concentration in the third laminate is different from that of the second and first laminates. By combining laminates having different gradients in fiber concentrations, a combined composite laminate may be produced with intermediate properties. For example, the second laminate may have a gradient in fiber concentration that encourages the development of bending properties in the combined composite laminate, while the first and third laminates may have a gradient in fiber concentration that encourages the development of stiffness in the combined composite laminate.

Figure 9B:
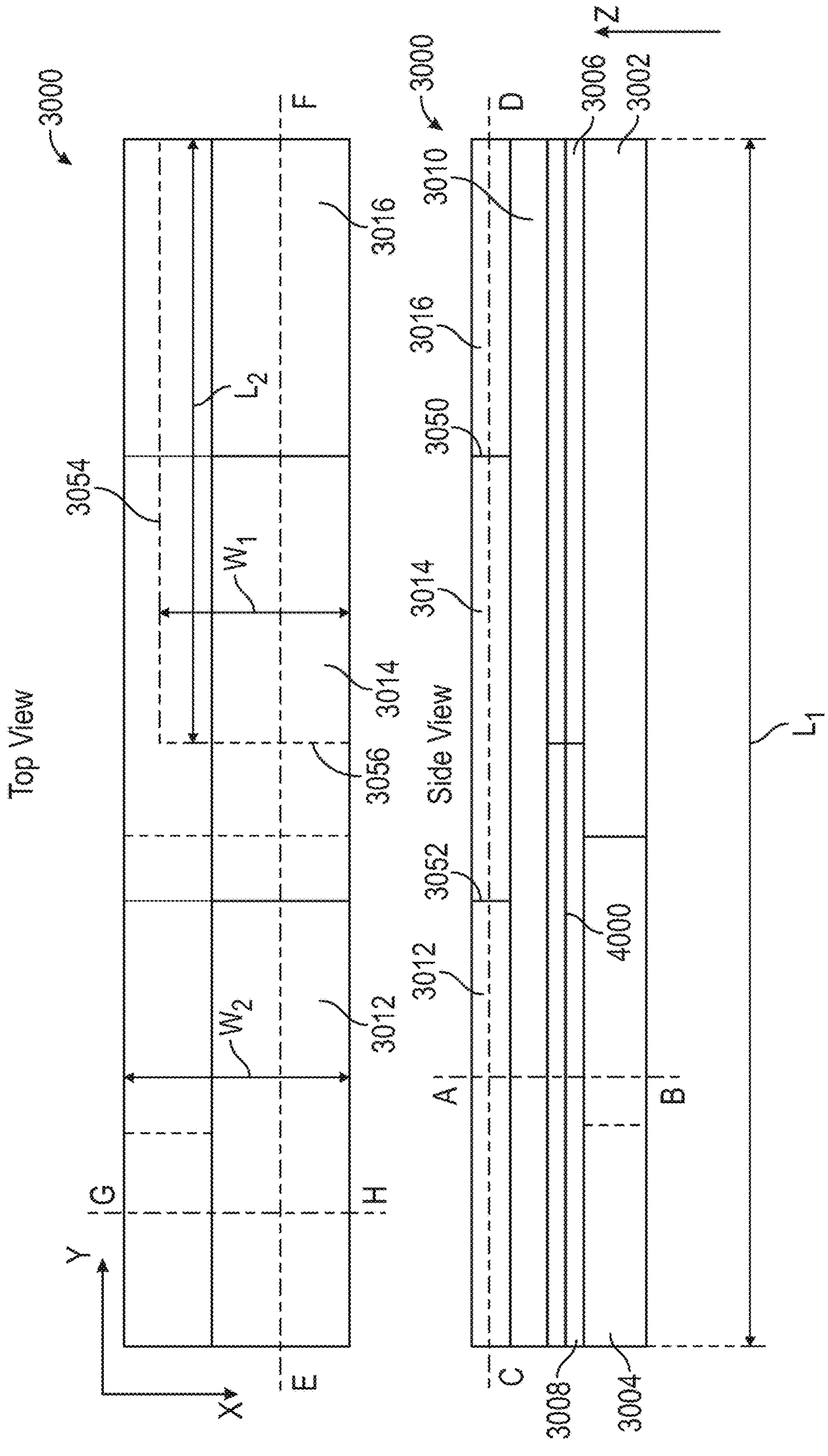
FIG. 9B depicts a combined composite laminate that comprises laminates of different thicknesses, widths and lengths. The combined composite laminate also comprises a plurality of different gradients in different directions.

In an embodiment, some layers present in some of the laminates may be continuous through the "adjacent laminates" present in the preform. FIG. 9B depicts a side view and top view of a combined composite laminate 3000 (of length $L_1$ and width $w_2$) that comprises a plurality of laminates 3002, 3004, 3006, 3008, 3010, 3012, 3014, and 3016 that are disposed alongside each other. Each of the laminates may comprise one or more layers. It is desirable for each of the laminates to comprise a plurality of layers. Some of the laminates are disposed upon other laminates (they contact one another along horizontal surfaces in the x-y plane), while others contact each other along the vertical edges in the z-direction. It is to be noted that the terms "horizontal" and "vertical" only apply to the FIG. 9B as it is presently depicted for purposes of discussing relationships between the surfaces and edges. It is obvious that if the combined composite laminate 3000 is rotated the horizontal surfaces as they are presently depicted in the FIG. 9B will no longer be horizontal.

It is to be noted that not all laminates are depicted in the top view of the combined composite laminate 3000. Only laminates 3012, 3014 and 3016 (which are the laminates at the top of the combined composite laminate) are completely shown in the top view. Laminate 3006 (having its edges 3054 and 3056 depicted with dotted lines) of length $L_2$ and width $w_1$ is also shown in the top view. Laminates that contact one another directly either along any of the edges in the z-direction or along the faces in the x and y-directions are termed neighboring laminates.

The plurality of laminates are interwoven in the x-direction, the y-direction and in the z-direction (the thickness direction). Each laminate may comprise one or more layers. The side view and top view of the combined composite laminate 3000 shows that the laminates have lengths and widths that are different from each other. This combination of laminates having different thicknesses, lengths and widths produces interweaving of the laminates when they are joined to produce the combined composite laminate 3000 of a particular shape.

For example, laminate 3002 is shorter in length than laminate 3004, while laminate 3010 is longer than all the other laminates and extends the entire length and width of the combined composite laminate 3000. In addition, laminates 3002 and 3004 have a different thickness that the remaining laminates. In an embodiment, laminates 3002 and 3004 are thicker than the other laminates. Some of the laminates contact each other along their respective edges, while other laminates contact each other along an entire surface. For example, laminates 3012 and 3014 contact each other along edge 3052 and laminate 3014 contacts laminate 3016 along edge 3050. Laminate 3010 (which extends the entire length L and width $w_2$ of the combined composite laminate 3000) contacts laminates 3006 and 3008 along their upper surfaces. Laminate 3006 which is disposed beneath laminate 3010 has a width $w_1$ which is less than width $w_2$ of laminate 3010. In the top view of the FIG. 9B, it may be seen that laminate 3006 contacts another laminate (not explicitly shown or numbered) at edges 3054 and 3056.

The combined composite laminate 3000 may have a plurality of gradients in fiber concentration and hence in pore size in each of the x-direction, the y-direction and the z-direction. In an embodiment, a section AB (see side view) taken along the thickness of the combined composite laminate would have a first gradient in pore size (and in fiber concentration per unit volume), while a section taken along section CD (see side view) in the length direction would have a second gradient in pore size (and in fiber concentration per unit volume) along the length $L_1$ of the combined laminate. The first gradient may or may not be identical to the second gradient.

In another embodiment, a section taken along EF in the y-direction (see top view) and GH in the x-direction (see top view) would have third and fourth gradients in pore size (and in fiber concentration per unit volume) respectively.

In this manner, a combined composite laminate may have a plurality of gradients in pore size and in fiber concentration per unit volume. These plurality of gradients can extend in a plurality of directions. The plurality of gradients can be the same as each other or different from each other. These gradients do not always need to be along axes that are orthogonal to each other. The gradients can be at angles that are not 90 degrees.

It is to be noted that a single layer of the tows can also protrude from one laminate into a neighboring laminate. For example, a layer 4000 of tows can extend from laminate 3008 into laminate 3006.

It is to be noted that while the figures and discussion herein are directed to a preform having woven layers or layers, the invention may also be directed to braided layers or layers that comprise axial fibers and bias fibers. Braided layers for composites comprise of two (or more) interlaced sets of fibers. Biaxial braids comprise two sets of fibers and triaxial braids include a third set of axial fibers.

Figure 10:
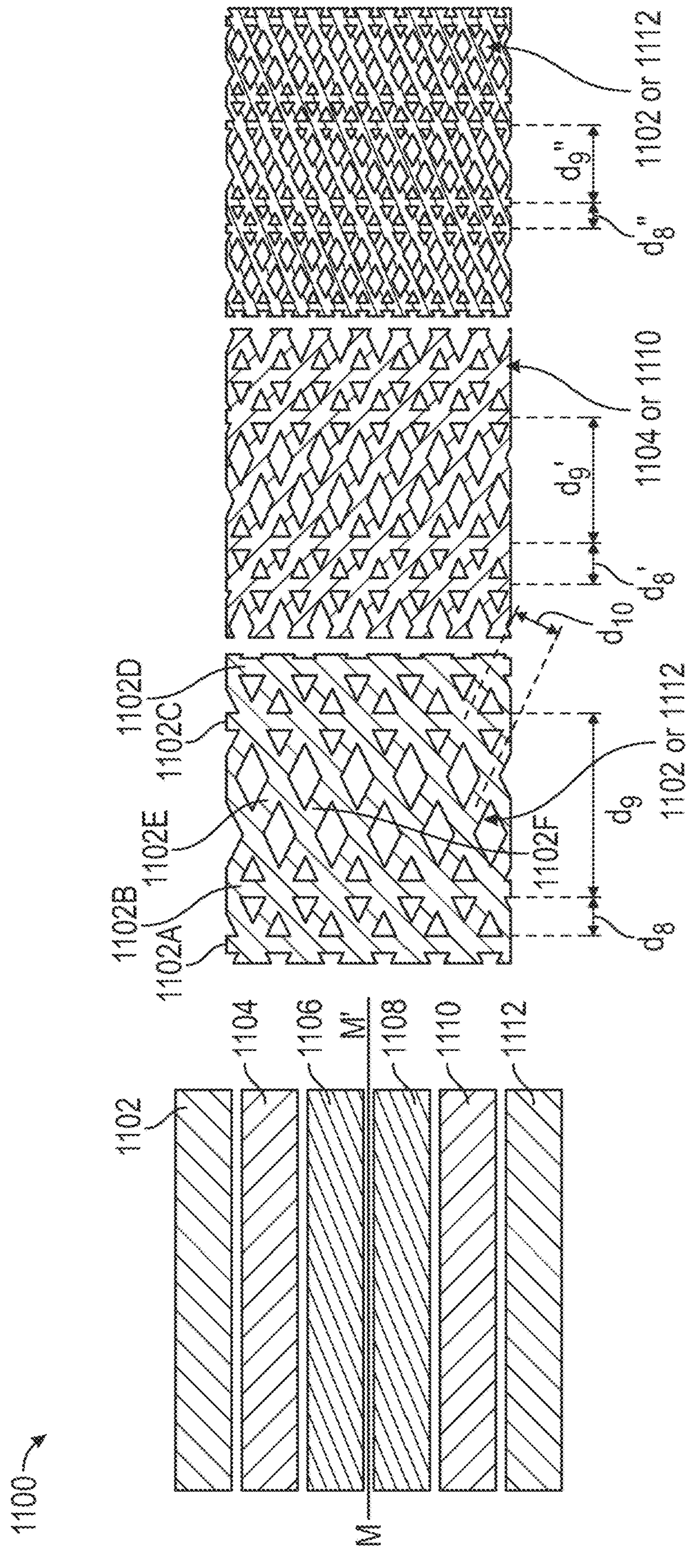
FIG. 10 depicts a combined composite laminate that comprises a plurality of laminates each comprising a plurality of braided layers.

FIG. 10 depicts a combined composite laminate 1100 that comprises 6 different braided laminates 1102, 1104, 1106, 1108, 1110 and 1112. Each laminate comprises a plurality of layers (not shown). The 6 laminates are distributed symmetrically about a center line MM'. Laminates 1102 and 1112 are similar to each other (i.e., the fibers are equally spaced and have the same denier) and are spaced further from the center line MM' than the laminates 1104 and 1110 as well as 1106 and 1108. Similarly, laminates 1104 and 1110 are similar to each other and laminates 1106 and 1108 are similar to each other. Laminates 1102 and 1112 comprises two pairs of axial fibers—a first pair of axial fibers 1102A and 1102B and a second pair of axial fibers 1102C and 1102D. The first pair of axial fibers 1102A and 1102B are spaced at a distance $d_8$ apart from each other, while the first pair of axial fibers 1102A and 1102B are spaced at a distance do from the second pair of axial fibers 1102C and 1102D. The laminates 1102 and 1112 also comprise bias fibers 1102E and 1102F spaced at a distance $d_{10}$ apart from each other.

The laminates 1104 and 1110 (that are closed to the center line MM' than the laminates 1102 and 1112 respectively) have corresponding axial fibers that are spaced at a distance $d_8'$ and $d_9'$, where $d_8'$ is smaller than $d_8$ and $d_9'$ is smaller than $d_9$. Similarly, the bias fibers of the laminates 1104 and 1110 are spaced at a distance (not shown) that is smaller than the spacing $d_{10}$ of the laminates 1102 and 1112. In a similar manner, the laminates 1106 and 1108 (that are closed to the center line MM' than the laminates 1104 and 1110 respectively) have corresponding axial fibers that are spaced at a distance $d_8''$ and $d_9''$, where $d_8''$ is smaller than $d_8'$ and $d_9''$ is smaller than $d_9$. Similarly, the bias fibers of the laminates 1106 and 1108 are spaced at a distance (not shown) that is smaller than the spacing of bias fibers of the laminates 1104 and 1110.

Thus it can be seen that the combined composite laminate 1100 of the FIG. 10 comprises several laminates where each laminate has a different concentration of fibers per unit volume from the outermost laminates to the inner most laminates. This results in a gradient in the pore sizes from the outermost laminates to the innermost laminates. This gradient enables a uniform matrix density throughout the combined composite laminate.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A ceramic matrix combined composite laminate comprising:

a plurality of composite laminates; wherein each laminate has a different fiber concentration gradient from another laminate that it is in contact with; and wherein each laminate comprises:

a ceramic matrix that encapsulates a plurality of layers that comprise fibers; wherein each layer comprises a plurality of fill fibers and a plurality of warp fibers;

wherein each laminate comprises a first layer, a second layer and a third layer, wherein the first layer is an outermost layer of the laminate, the second layer is in an interior of the laminate closer to a center of the laminate than the first layer, and the third layer is in the interior of the laminate closer to the center of the laminate than the second layer, wherein a spacing between weft fibers of the first layer is greater than the spacing between weft fibers of the second layer and the spacing between warp fibers of the first layer is the same as the spacing between warp fibers of the second layer, and wherein a spacing between weft fibers of the second layer is greater than the spacing between weft fibers of the third layer and the spacing between warp fibers of the second layer is the same as the spacing between warp fibers of third layer.

2. The ceramic matrix combined composite laminate of claim 1, wherein the fibers are ceramic fibers, carbon fibers, or a combination thereof.

3. The ceramic matrix combined composite laminate of claim 1, wherein the combined composite laminate is a deltoid-shaped preform.

4. The ceramic matrix combined composite laminate of claim 1, wherein an areal space between fill and warp fibers decreases from the outermost layer of each laminate to the layer located in the interior of the laminate.

5. The ceramic matrix combined composite laminate of claim 1, wherein the fiber concentration gradient is a linear gradient.

6. The ceramic matrix combined composite laminate of claim 1, wherein the fiber concentration gradient is a curvilinear gradient.

7. The ceramic matrix combined composite laminate of claim 6, wherein the curvilinear gradient follows a spline function having exponents between 2 and 5.

8. The ceramic matrix combined composite laminate of claim 1, wherein the combined composite laminate comprises n separate laminates, where n is an integer.

9. The ceramic matrix combined composite laminate of claim 1, wherein a distance between fill fibers gradually decreases from the outermost layer of each laminate to the layer located in the interior of the laminate, while a distance between warp fibers remains constant from the outermost layer to the layer located in the interior of each laminate.

10. The ceramic matrix combined composite laminate of claim 1, wherein the ceramic matrix comprises SiC, $Al_2O_3$, BN, $B_4C$, $Si_3N_4$, $MoSi_2$, $SiO_2$, SiOC, SiNC, and/or SiONC.

11. The ceramic matrix combined composite laminate of claim 1, wherein the fibers comprise SiC.

12. The ceramic matrix combined composite laminate of claim 1, wherein a matrix density at the outermost layer of each laminate is the same as that in the interior of each laminate.

13. The ceramic matrix combined composite laminate of claim 1, wherein the matrix is substantially devoid of pores in the interior of each laminate.

14. The ceramic matrix combined composite of claim 1, wherein a phase difference between peaks of warp fibers in successive layers is reduced with each layer from the outer surface to the center of the ceramic matrix.

15. The ceramic matrix combined composite of claim 14, wherein the phase difference between a first layer that is an outermost layer and a second layer is between 30 and 60 degrees, the phase difference between a second layer and a third layer is 25 to 45 degrees and the phase difference between the third layer and a fourth layer is 20 to 30 degrees.

16. A method for manufacturing a ceramic matrix composite comprising:

placing in an infiltration chamber a laminate comprising:

a plurality of layers that comprise fibers; wherein each layer comprises a plurality of fill fibers and a plurality of warp fibers;

wherein the plurality of layers includes a first layer, a second layer and a third, wherein the first layer is an outermost layer of the laminate, the second layer is in an interior of the laminate closer to a center of the laminate than the first layer, and the third layer is in the interior of the laminate closer to the center of the laminate than the second layer, wherein a spacing between weft fibers of the first layer is greater than the spacing between weft fibers of the second layer and the spacing between warp fibers of the first layer is the same as the spacing between warp fibers of the second layer, and wherein a spacing between weft fibers of the second layer is greater than the spacing between weft fibers of the third layer and the spacing between warp fibers of the second layer is the same as the spacing between warp fibers of third layer;

infiltrating the plurality of layers with a precursor that comprises a ceramic precursor; and joining a plurality of laminates such that a fiber concentration gradient per unit volume in each laminate is different from that of another laminate in the plurality of laminates.

17. The method of claim 16, wherein a matrix density at the outermost layer of each laminate is the same as that in the interior of the laminate.

18. The method of claim 16, wherein an areal space between fill and warp fibers gradually decreases from the outermost layer of each laminate to the layer located in the interior of the laminate.

19. The method of claim 16, wherein the fibers comprise SiC and wherein the ceramic matrix comprises SiC, $Al_2O_3$, BN, $B_4C$, $Si_3N_4$, $MoSi_2$, $SiO_2$, SiOC, SiNC, and/or SiONC.

20. The method of claim 16, wherein a distance between fill fibers gradually decreases from the outermost layer of each laminate to the layer located in the interior of the laminate, while a distance between warp fibers remains constant from the outermost layer to the layer located in the interior of the laminate or wherein a distance between warp fibers gradually decreases from the outermost layer of each laminate to the layer located in the interior of the laminate, while a distance between fill fibers remains constant from the outermost layer to the layer located in the interior of the laminate.

* * * * *